US012632807B2

(12) United States Patent
Fahrni et al.

(10) Patent No.: US 12,632,807 B2
(45) **Date of Patent: *May 19, 2026**

(54) EMBEDDED TASKS IN COLLABORATIVE PRODUCTIVITY SUITE

(71) Applicant: Google LLC, Mountain View, CA (US)

(72) Inventors: Thomas Fahrni, Zurich (CH); Remi Wesley Ogundokun, Brooklyn, NY (US); Michael Kaeser, Baden (CH); Lars Krüger, Zurich (CH); Ali Abdelhadi, New York, NY (US); Lara Scheidegger, Herrliberg (CH); Konstantin Yakovlev, Zurich (CH); Behnoosh Hariri, New York, NY (US); Beixi Li, Long Island City, NY (US); Timothy Chen, Long Island City, NY (US); Barak Ben Noon, Brooklyn, NY (US); William Joshua Billingham, Brooklyn, NY (US); Stephan Burkhardt, Umiken (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/766,543

(22) Filed: Jul. 8, 2024

(65) Prior Publication Data

US 2024/0362553 A1 Oct. 31, 2024

Related U.S. Application Data

(63) Continuation of application No. 17/489,302, filed on Sep. 29, 2021, now Pat. No. 12,033,096.

(51) Int. Cl.
G06Q 10/0631 (2023.01)

(52) U.S. Cl.
CPC ............... G06Q 10/063118 (2013.01); G06Q 10/063114 (2013.01)

(58) Field of Classification Search
None
See application file for complete search history.

(56) References Cited

U.S. PATENT DOCUMENTS

| 6,405,225 | B1 | 6/2002 | Apfel et al. |
| 10,984,484 | B1 | 4/2021 | Nidecker et al. |
(Continued)

FOREIGN PATENT DOCUMENTS

| JP | 2009065592 A | 3/2009 |
| JP | 2009521037 A | 5/2009 |
(Continued)

OTHER PUBLICATIONS

Adobe: "Older versions of Adobe Experience Manager, CQ, and CRX," Nov. 23, 2017, 4 pages, Retrieved from URL: https://helpx.adobe.com/in/experience-manager/6-3/forms/using/todo-lists.html.
(Continued)

*Primary Examiner* — Stephanie Z Delich
(74) *Attorney, Agent, or Firm* — Lowenstein Sandler LLP

(57) ABSTRACT

A method and a system are provided that include providing a user interface (UI) of a first application, the user interface of the first application comprising a list of tasks, a visual status indicator of a status of each task in the list, and an assignment UI element to request that a corresponding task on the list be completed, receiving, via the user interface of the first application, user input indicating a request of a user to create a new task, causing the new task to be added to the list of tasks in the user interface of the first application with a first visual status indicator indicating that a status of the new task is incomplete, receiving, via the user interface of the first application, a user selection of the assignment UI
(Continued)

element to request that the new task be completed on behalf of the user, causing a first notification indicating the new task and the request to complete the new task on behalf of the user to be sent to a second application, receiving a second notification associated with the second application, the second notification being indicative of a change to the status of the new task, and in response to receiving the second notification associated with the second application, causing the first visual status indicator of the new task to be modified in the user interface of the first application to graphically illustrate the change in the status of the new task.

20 Claims, 6 Drawing Sheets

(56)         References Cited

U.S. PATENT DOCUMENTS

| | | | |
|---|---|---|---|
| 11,107,021 | B2 | 8/2021 | Fowler et al. |
| 2007/0294366 | A1 | 12/2007 | Ozzie et al. |
| 2008/0313281 | A1 | 12/2008 | Scheidl et al. |
| 2009/0037492 | A1 | 2/2009 | Baitalmal et al. |
| 2013/0013560 | A1 | 1/2013 | Goldberg et al. |
| 2014/0164080 | A1 | 6/2014 | Thompson, Jr. et al. |
| 2014/0289742 | A1 | 9/2014 | Suh et al. |
| 2015/0142719 | A1 | 5/2015 | Behuria et al. |
| 2015/0370769 | A1 | 12/2015 | Pereira Filho et al. |
| 2019/0095255 | A1 | 3/2019 | Anima et al. |
| 2019/0213528 | A1 | 7/2019 | Gupta et al. |
| 2019/0318418 | A1 | 10/2019 | Khurana et al. |
| 2021/0073713 | A1 | 3/2021 | Balasubramanian et al. |

FOREIGN PATENT DOCUMENTS

| | | | |
|---|---|---|---|
| JP | 2011150424 | A | 8/2011 |
| JP | 2021501386 | A | 1/2021 |
| WO | 0161552 | A2 | 8/2001 |
| WO | 2017178818 | A1 | 10/2017 |

OTHER PUBLICATIONS

Broadcom: "New User Experience: View My Tasks or My Team Tasks," Clarity PPM SAAS 15.41, Aug. 1, 2019, 5 Pages, Retrieved from URL: https://techdocs.broadcom.com/us/en/ca-enterprise-software/business-management/clarity-project-and-portfolio-nanagement-ppm-on-demand/15-4-1/using/getting-started-with-the-new-user-experience/new-user-experience-view-ny-tasks-ormy-team-tasks.html.

Doug-Belshaw, "Use 'Action Items' in Google Docs to Turn Comments Into Tasks for Your Team," NewCo, Dec. 13, 2016, 4 Pages, Retrieved from URL: https://shift.newco.co/2016/12/13/use-action-items-in-google-docs-to-turn-comments-into-tasks-for-your-team/.

International Search Report and Written Opinion for International Application No. PCT/US2022/045107, mailed Jan. 10, 2023, 14 pages.

International Search Report and Written Opinion for International Application No. PCT/US2022/045263, mailed Jan. 17, 2023, 15 pages.

Kyber: "Kyber Guide," 72 Pages, [Retrieved on Sep. 28, 2021] Retrieved from URL: https://kyber.me/kyber-for-slack-how-todo-list-task-project-management-calendar-reminders/.

Office Action for Indian Patent Application No. 202447033580, mailed Jul. 3, 2025, 05 Pages.

Office Action for Japanese Patent Application No. 2024519441, mailed Feb. 4, 2025, 8 Pages.

Office Action for Japanese Patent Application No. 2024519441, mailed May 27, 2025, 06 Pages.

Office Action for Indian Patent Application No. 202447033581 mailed Apr. 1, 2026, 8 Pages.

EMBEDDED TASKS IN COLLABORATIVE PRODUCTIVITY SUITE

RELATED APPLICATIONS

This application is a continuation application of co-pending U.S. patent application Ser. No. 17/489,302, filed Sep. 29, 2021, which is incorporated herein by reference.

TECHNICAL FIELD

Aspects and implementations of the present disclosure relate generally to sharing data across collaborative applications, and more particularly relate to embedding shared instances of task related data across different applications.

BACKGROUND

Productivity applications, often grouped into suites of interactive applications such as those used for producing documents, presentations, worksheets, databases, charts, graphs and other material have become widespread work environments. In some situations, applications enable more than one user to access or modify a file in order to facilitate collaborative work and expedite the completion of a work product. It has become increasingly important, especially for web applications and cloud-based applications to provide flexibility of access and sharing of data between instances of applications and files shared between different users. The distributed nature of the application platforms has allowed collaborators that are geographically remote from one another to collaborate on various tasks and projects that have previously required being in proximity to one another. This has, in turn, lead to the implementation of a variety of different storage, access, retention and modification policies and progress management functionality.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In some implementations, a system and method are disclosed. In some implementations, a system includes a memory device and a processing device coupled to the memory device. The processing device can be configured to receive, via a user interface of a first application, user input indicating a request to create a task, and to present, in a user interface of a first application, a visual representation of the task. This can include generating, based on the user input indicating the request to create a task, a data object defining a plurality of properties of the task and generating the visual representation of the task based on the plurality of properties defined in the data object. The processing device can also be configured to receive user input indicating an assignment of the task to an assignee on behalf of an assignor user, and to send, to a second application, a first notification indicating the task and the assignment of the task to the assignee user. The processing device can be further configured to receive, from the second application, a second notification indicative of a change to a status of the task, and to modify the visual representation of the task to graphically illustrate the change in the status of the task in the user interface of the first application. The processing device can also be configured to add the assignee indicated by the user input to the data object. In addition, the processing device can be configured to receive user input indicating a second assignee of the task, and send the second assignee to the data object for the task.

In some implementations, a method includes receiving, via a user interface of a first application, user input indicating a request to create a task and presenting, in the user interface of the first application, a visual representation of the task. Presenting the visual representation can include generating, based on the user input indicating the request to create the task, a data object defining a plurality of properties of the task, storing the data object in a data store, and generating the visual representation of the task based on the plurality of properties defined in the data object The method can also include receiving user input indicating an assignment of the task to an assignee, sending, to a second application, a first notification indicating the task and the assignment of the task to the assignee. It can further include receiving, from the second application, a second notification indicative of a change to a status of the task, and modifying the visual representation of the task to graphically illustrate the change in the status of the task in the user interface of the first application. In some implementations, the method can also include adding the assignee indicated by the user input to the data object, receiving user input indicating a second assignee of the task, and adding the second assignee to the data object for the task, as well as sending an email to the assignee notifying the assignee of the assigned task.

In other implementations, a method includes receiving, by a first application, a notification from a second application, the notification indicating an assignment of a task to an assignee, and presenting, in a graphical user interface (GUI) of the first application, a visual representation of the task, where the visual representation comprises one or more interactive graphical elements, wherein one of the one or more interactive graphical elements corresponds to a completion status of the task. The method also includes modifying, based on user input pertaining to the one of the one or more interactive graphical elements, the completion status of the task, and sending a notification indicating the modified completion status of the task to the second application. It can also include receiving a second user input indicating a change to a property of the task, modifying an interactive graphical element corresponding to the property based on the second user input; and refraining from notifying the second application about the change to the property of the task. One of the interactive graphical element corresponding to the property can include a setting preventing changes to the property from being communicated to the second application. The method can also include sending an email indicating the modified completion status of the task to the assignor of the task.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
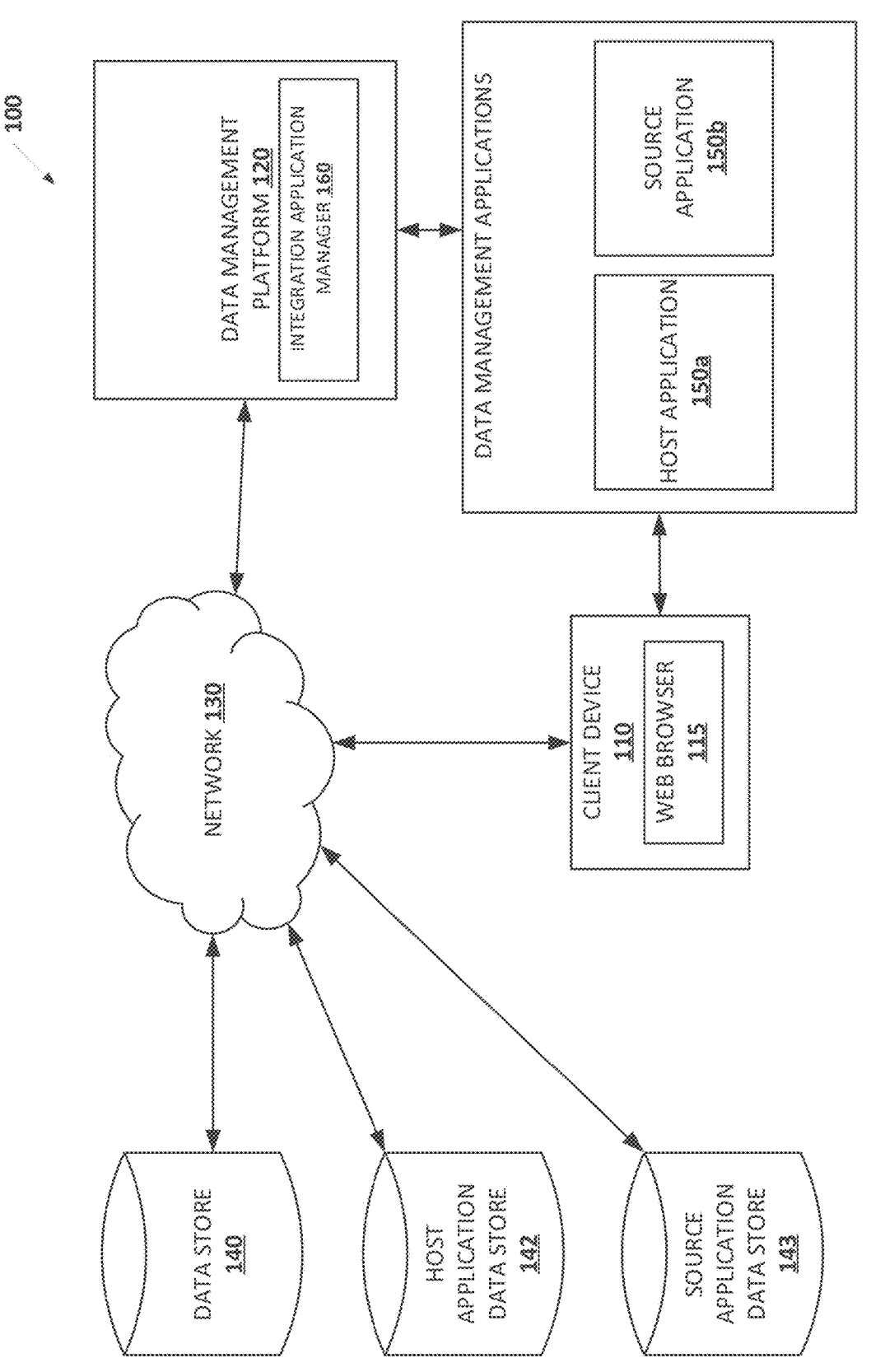
FIG. 1 illustrates an example system architecture, in accordance with implementations of the present disclosure.

Aspects of the present disclosure relate to sharing embedded instances of task related data between different applications. A variety of application platforms have become available for users to aid with productivity, content creation, scheduling, project management and other common work related activities. Accordingly, a variety of productivity suites including applications for producing and editing documents, presentations, worksheets, databases, charts, etc. have become widespread work environments. Further, such applications can be implemented in distributed cloud-based platforms that that are web-based and allow collaboration between teams of users.

In view of these possibilities, a trend has developed of an ever increasing number of users taking advantage of the functionality offered by the plethora of web applications (e.g., email applications, document processing applications, calendar applications, spreadsheet applications, project management applications, etc.) that often form part of cloud-based productivity suites, and collaboration has increasingly begun to involve a continual progression of activities across a variety of such applications and the collaborative interaction between larger numbers of people.

As a user's activities extend to using information available in disparate applications, the user often needs to switch between applications, context, windows, or interfaces in order to access the relevant information and plan out actions related to that information. For example, a user may be using a word processing application to work on an electronic document including information associated with a task that is defined in a task management application, and may want to assign the task to another user. Currently, the user would need to switch to the task management application to assign the task to another user and then go back to the word processing application to continue working on the electronic document. In another example, teams of collaborators may need to assign tasks related to a project and track whether or not assigned tasks are completed. In addition, individuals to whom tasks are assigned may need to have a tracker for the tasks that are specifically assigned to them where they can add details meaningful to them.

However, conventional team task lists and personal task trackers are disjoint constructs that are not integrated or interconnected with each other. This lack of integration hinders productivity and leads to constant switching between different applications, interfaces, etc. Such switching is inconvenient to the user and can take significant time and computing resources. Furthermore, additional time and computing resources are consumed to allow users to keep track of and coordinate assignment and execution of various tasks. Having separate instances of the same task related information in different applications makes it difficult to keep all instances of the information synchronized and up to date. Moreover, having information representative of the same task in disparate applications that are not synchronized can lead to a discontinuous work flow and stymied progress due to team members relying on inconsistent task related information. On the other hand, in some cases, having all task-related information synchronized and updated may also undesirably hinder the productivity of the individual performing the task or provide unnecessary information to the other team member. For example, an assignee of a task may want to change the due date by which a task assigned to the assignee needs to be completed because of other tasks that also need to be done. Synchronizing this information with the task-related information accessible to the team and the assignor of the task may lead to inconsistency of the task related information between the application used by the assignor and the application used by the assignee.

The implementations disclosed herein address the aforementioned and other problems by providing a mechanism that enables a user to access or modify task related data from a task management application in an interface of another application, thereby reducing the number of times that a user may need to switch between applications or interfaces. In particular, a framework is provided whereby individual tasks that are represented by a data object originating from or defined by one application (e.g., a task management application) can be embedded inside a data container or file of another application (e.g., a word processing application) such as inside a planning document. This addresses the issue of maintaining separate lists of tasks since the data object representative of a task is associated with both a source application (e.g., a task management application) and a host application (e.g., a word processing application) in which it is embedded. Furthermore, users are able to view all the tasks assigned to them in their personal task list through the graphical user interface of a task management application and annotate them with personal notes, descriptions, due dates and other contextual information. The users are also able to modify the task to indicate whether it is completed or not. This indication of the completion state of the task can be synchronized between the assignee version of the task (e.g., the task management source application's data object representative of the task) and the team/assignor version of the task (e.g., the word processing host application's embedded data object representative of the task). In this manner, task related information that is important and relevant for both the assignor and assignee is synchronized and kept up to date while personal notes and other personal task related information can be freely created and modified by the assignee without burdening the assignor.

In one example scenario illustrating the benefit of having embedded data in an application, a user may be working in a document through a word processing application and may want to assign a task to another user without leaving the context (e.g., interface) of the document. Aspects of the disclosure disclosed herein allow a user to embed a "task" in the document that is associated with a "task" in a task management application, thereby eliminating the need for the user to switch to the task management application to assign the task to another user. In some implementations, embedding a "task" involves creating a data object representative of the task in the graphical user interface (GUI) of the word processing application as well as associating task data with or anchoring task data on a visual representation of the task in the GUI of the word processing application. This embedded task can then also be accessed and updated through a GUI of the task management application as well. Similar functionality can be implemented for various other application types where there is a need to maintain joint ownership over data by embedding information from one application into another (e.g., a spreadsheet application and a task management application where a task can be embedded into a cell or a row of a worksheet).

The data shared and stored by each of the two applications can be subject to different data policies (e.g., regarding data location, sharing, retention, etc.). For example, if a task is embedded in a document, the data policy that is applicable to the document may require the document data to be stored in the European Union (EU) while the data policy applicable to the task may require task data to be stored in the United States (US). In some implementations, to ensure compliance with different data policies, when data from one application (e.g., a source application) is embedded or generated in another application (e.g., a host application), each application can maintain separate copies of the data in separate respective locations so that each copy can conform to the compliance needs and requirements of the respective application or location. This separated data ownership approach can create a clear delineation for data ownership between the applications and create a data ownership model that avoids conflicts between policies.

Embedded data can be modified from both the host application (the application in which it is embedded) and the source application (the parent application from which the data type originates). Aspects of the present disclosure provide a mechanism for handling data changes that maintains data integrity between the applications with which the data is associated, thereby facilitating the interoperability of the applications and improving the user experience. For example, if data that is embedded in a host application gets deleted from a source application, it also gets deleted from the host application via a notification queue system. Conversely, if source application data that is embedded in a host application gets deleted from a host application, it will get deleted from the source application via the notification queue system. Some implementations can use a database feature that allows the delivery of reliable notifications between different systems (e.g., applications). For example, if a task data object gets deleted in a task management application, a notification queue system can be used to make sure that a word processing application in which a corresponding task data object is embedded is notified of the deletion. In one implementation, the data associated with the task can be deleted from an index table accessible by both application and then, eventually, deleted from the document of the word processing application in which the corresponding task data object is embedded. In another example implementation, when the task gets deleted in a task management application, a queue message with a notification of the deletion can be transactionally scheduled and then asynchronously invoked by a database system (e.g., at a later time) and retried until confirmation of a successful transmission/receipt of the notification.

In some implementations, to ensure that each application in which a particular source application data object is embedded is notified of a change (e.g., update, deletion, modification) to the source application data object occurring in the source application interface, each source application data object can have data associated with a record of each application in which it is embedded. As used herein with respect to a data object, each of the terms "modification" and "change" shall be inclusive of "deletion". Accordingly, if a data object is edited or updated in its respective source application, a notification can be sent to the host application to update the embedded copy (e.g., the source application data object embedded in the host application file) that is also referred to herein as the corresponding "embedded data object". Conversely, if the embedded source application data object (e.g., embedded data object) is edited or updated from within a host application (e.g., through a host application interface), a notification can be sent to the source application to update the source copy of the data object (e.g., source application data object) that is also referred to herein as a corresponding "source data object". In some implementations, to ensure reliable delivery of the notification, the notification can be resent by the application through which the change occurred until a confirmation or acknowledgement of a receipt of the notification is received from the other application (e.g., the application to which the notification to update is sent). These notifications allow teams of collaborators to assign tasks related to a project and track whether or not assigned tasks are completed. Through the embedding of the data objects in the host application, a single place where the tasks and the individuals to whom they are assigned along with the completion status of the tasks can be seen is provided that obviates the need for looking elsewhere to obtain that information.

In some situations, different access rules (e.g., permissions to view or edit the data) may pertain to the host application file and the embedded data. Aspects of the present disclosure provide a mechanism that can address conflicts between permissions to ensure that updates to data can be made without contravening access rules applicable to either the host application file or the embedded data. For example, modifications to embedded data objects in the host application can follow the access rules of the host application. This means that only users who have permission to edit or modify the host application according to the access permissions of the host application can edit or modify the embedded data. Accordingly, the source application can grant access to change a data object in the source application (e.g., the source application data object) to any user that has access permission to change the corresponding embedded data object in the host application.

Conversely, changes or updates made to the data object (e.g., source application data object) in the source application can be reflected in the embedded data object in the host application only when the update is issued on behalf of a user (e.g., the change is made by a user) who has access permission to make changes in the host application file where the data object is embedded. If the user making the change to the data object in the source application does not have access permissions to make changes to the host application file in which the data object is embedded, the change can remain in a pending state for another user who does have access permissions to make changes to the host application file to accept the change and update the host application file. For example, a change to a data object made in a source application can be recorded in a location accessible by both the source application and the host application but not committed to the host application file where the data is embedded due to a lack of access permissions. In this case, a notification can be presented to users of the host application who have access permissions allowing them to make changes to the host application file regarding the pending change and a prompt can be provided to them to either accept or reject the change.

In some embodiments, the access check (e.g., determination whether a user has the requisite access permissions to make a change to a particular data object) can happen at both the source application and the host application. In one example, the host application can always perform the access check since the source application always sends the notification regarding a change to the host application regardless of whether the change can be committed to the host application file where the data object to which the change is being made is embedded. In this case, as described in more detail below, the host application can take the changes made to the data object from either the source application or the host application and record them in another location (e.g., a third location separate from the location where host application data is recorded and the location where source application data is recorded). In another example, a task management application can check whether a user trying to make changes to a particular data object has the access permissions to edit the host application file in which the data object is embedded, and, if so, will grant the user permission to edit the data in the source app and propagate the change to the host application.

In order to minimize conflicts resulting from changes to corresponding data objects in respective host and source application and to ensure that both the host application and the source application have up-to-date data objects, some implementations maintain a separate storage area (e.g. a data store) for recording data associated with the source application data objects that are embedded in a host application file. As noted earlier, if the source application and the host application have different access rules (e.g., sets of different access permissions for different users), the changes made to a data object in the source application may not be synced to the host application (e.g., the corresponding embedded data object may not be updated with the change) if the user making the change does not have access permission to make changes in the host application file. In order to ensure that such changes are not lost, they can be recorded in a separate storage that can serve as an ultimate "source of truth" regarding the data objects. In some implementations each of the pair of application can have data recorded in a respective data store. This third location can be a third data store where all changes pertaining to a data object (e.g., including a source application data object and the corresponding embedded data object) and their history are recorded from both the host application and the source application. In one implementation, this third storage location can be managed exclusively by the host application (e.g., records of changes to data are made by the host application regardless of whether the changes were made in the source application or the host application). The third storage location can include all of the source application data objects ever embedded in the host application file as well as all of the changes that were ever made to those data objects. For example, a word processing application can record in a separate data store all the task data objects that were ever embedded in the document from a task management application along with all of the changes that were previously made to those data objects. Having a third storage location that is separate from the storage location for respective data of each of the host and source application can lower computational costs and reduce data transfer loads if the third location is managed entirely by the host application. This is because such an arrangement can reduce the number of queries and transfers of data between applications and their respective data stores along with the associated computational costs and network bandwidth especially if and when they are located in geographically distant locations.

This third storage area can serve as a source of truth (e.g., reliable source of information regarding a data object) because the host application file (also referred to herein as an "embedded data container") can change in a way that results in stale embedded data. For example in a scenario with a word processing application file that has an embedded task data object that was marked as completed, the word processing application file can be reverted to an earlier version where the embedded task data object was not marked as completed resulting in stale (e.g., outdated, inaccurate) embedded task data object. In another example, update notifications resulting from a change to an embedded data object occurring in a host application can permanently fail to be delivered to a source application (e.g., due to a disabled account) and result in an undesirable discrepancy between the source copy of the data object and the embedded data object. Having a third location containing a record of the embedded data objects can obviate the need of preventing users of the host application file with embedded data objects from reverting the host application file to an earlier version if one desires to maintain an up-to-date representation of the embedded data object.

In some implementations, a third storage location can be an index table in a data store with records of data objects associated with each of a pair of applications. In some implementations, a host application can maintain a separate storage location for all embedded data that has been successfully synced with the source application and can update the storage location according to notification of data changes received from the source application even if the change cannot be committed to the host application embedded data container (e.g., host application file with the corresponding embedded data object) due to access permission limitations. In some implementations, this storage location may be realized as an embedded data index table and access (e.g., permission to modify) to this table can be granted to any user that has permission to make changes to a data object in either the source application or the host application. To ensure consistency of data between the source application and the third storage location (e.g., embedded data index table) a periodic consistency check verification can be performed between the storage location of the source application data and the third storage location. Similarly, a periodic consistency check verification can be performed between the storage location of the host application data and the third storage location. If an inconsistency in the data between the two locations is identified, an alert or notification can be issued or generated. The notification regarding the inconsistency between the third storage location and a storage location of the respective host or source application data can be presented to users of the respective application. For example, the host application can use an embedded index table as a source of truth for all embedded data and show a warning to a user when the embedded data in a host application embedded data container is out of sync with the index table.

As noted earlier, in some implementations, a task management application can serve as a source application and a word processing application can serve as a host application. Accordingly a data object representative of a task may be associated with or originating from the task management application and embedded in the word processing application. In some implementations, lists of items such as checklists can be created in a file of a word processing file (e.g. a shared cloud-based planning document) where the items on the checklist can be tasks. The textual and visual elements comprising the checklist items can be the visual representations of the data objects associated with a task. In some implementations, these data objects can be understood to be the embedded data objects associated with a corresponding data object in a task management application. As used herein, the data objects related to a task and embedded in a host application data container (e.g. a file) can be referred to herein as the "embedded task data object" or the "assignor task object" and the data object related to the same (e.g., corresponding) task that is found in the source application (e.g., a task management application) can be referred to herein as a "source task data object" or the "assignee task object". It should be understood that tasks and their related information can be associated with and anchored to other data and visual elements of a data container of a host application and that items in a checklist are used as an example for the sake of explanatory convenience. Other data and visual elements may be suitable to associate with a task related data object in other host applications. For example, in other implementations, tasks and their related information (along with the association to a source task data object) can be associated with and anchored to checkboxes, rows or cells in a spreadsheet, bullets, words, and ranges of text or symbols.

In some implementations, an assignor user (the "assignor") can request to create a list via an interface of a word processing application (e.g., the host application) and the requested list can be created, where the elements of the list can be data objects associated with a task. The assignor user can also request, via the interface of the word processing application (e.g., the host application), to and assign the task to another user (the "assignee"). The assignor can request to assign a task by selecting or indicating a user to whom the task should be assigned and can indicate a due date by which the task should be completed. In some implementations, an assignor can enter the assignee user name or address into a text entry field or select the assignee user from a list of users in order to assign a task to the assignee. In other implementations, the assignor can select a user by clicking on a visual representation of an assignee user (e.g., a picture, icon, or avatar of the assignee user) or by clicking a series of other interactive graphical elements (e.g., buttons). The assignee user can view the assigned task in the task management application (e.g., the source application) along with information related to the task. Information related to the task may be included in the data object that defines task properties including a task name, description, due date, and a project or file to which the task pertains or in which it is embedded. In some implementations, the assignor can reassign the task to another assignee user by changing the indication of which user the task should be assigned to in the host application graphical user interface. This can be performed in a manner analogous to that of assigning the task to the initial assignee. A reassignment of the task can remove the task from the personal task list (e.g., list of tasks in a task management application user interface) of the initial assignee and add the task to the person task list of the new assignee along with its related information.

In the task management application graphical user interface, the assignee can make a variety of changes to the properties of the task defined by the data object including changing the completion status, the task name, the due date, as well as notes and comments related to the task. In some embodiments, some of these changes can be used to update the embedded task data object in the word processing application according to the methods described herein relating to updating data objects in one application based on changes made to associated data objects in another application. For example, a change made by an assignee to the completion status of a task in the task management application can be used to update the task completion status (e.g., complete/incomplete) of the task in the word processing application. When a modification of an indication of a task completion state in the assignee task object is made, it can be propagated to make a corresponding change to the assignor task object in the host application reflective of the updated task completion state. In contrast, in some implementations, if an assignee makes changes to the task name, due date, notes, or other related information, those changes can remain visible and accessible only to the assignee in the source application (e.g., through the task management application graphical user interface) and not be synchronized with the host application (e.g., by making corresponding updates to the assignor task object in the word processing application). Thus, even if an assignee makes changes to the task in the source application, the assignor task object may not be impacted or modified unless the assignee makes a change to the completion status of the task.

In other implementations, when a task is assigned to an assignee user, an email is sent to the assignee to notify the assignee about the assigned task. The email may contain one or more tasks assigned to the assignee. The assignee can indicate or change the completion status of the task(s) through the graphical user interface of an email application. Changes made to the task completion status made in the email can be propagated to the corresponding embedded task data object in the host application and the source data object in the source application. Accordingly, in one implementation, if a user indicates that a task is completed in the email, the change in completion status can be used to update the assignor task object in the word processing application and the assignee task object in the task management application.

In instances where an assignee does not have permission to make changes or modification to a host application data container (e.g., file) where a data object associated with a task assigned to the assignee is embedded, changes made to the completion status of the task via the source application graphical user interface can generate a notification to other users of the host application. The notification or alert can be presented to one or more users of the host application who are permitted to make changes to the host application file according to the host application's access permissions to prompt those users to accept the change made to the completion status of the task associated with the assignor task object. Further details regarding the structure of and operations performed by elements of the systems and methods described herein are described below with reference to FIGS. 1-6.

Accordingly, aspects of the present disclosure provide a number of technical advantages including, for example, a mechanism that can conveniently embed data from one application into another application, thereby creating deeper integration between the applications and reducing time and computing resources that would be otherwise consumed by repeated context switching (e.g., switching between applications or interfaces) done by a user. Other technical advantages include, but are not limited to, providing automated solutions to ensure compliance with potentially conflicting policies with respect to data shared and stored by the applications, implement data integrity between the applications, and address conflicts between data access permission across the applications, thereby facilitating further interoperability of the applications, further improving the user experience, and further reducing time and computing resources that would be otherwise consumed by manually addressing conflicting data policies, manually ensuring data integrity or manually addressing conflicts between data access permission across the applications.

Additionally, through the selective updates between the host and source application, aspects of the present disclosure provide a tracker for the tasks that are specifically assigned to users where they can add meaningful details to aid with productivity without affecting what is seen in the host application. Accordingly, the mechanisms disclosed herein enable the addition of personal modifications to the task related data that do not interfere with the task related data associated with the same task that is visible to other collaborators, thereby reducing the time and the amount of computing resources that would otherwise be spent on allowing users to store such personal modifications in a separate location, and on switching between this separate location and the above applications.

Although the examples and implementations described herein may focus on particular types of applications such as document/word processing applications and task management applications, it should be understood that the systems and methods disclosed herein can analogously be implemented in a variety of applications and operating environments.

FIG. 1 illustrates an example system architecture 100, in accordance with implementations of the present disclosure. The system architecture 100 (also referred to as "system" herein) includes at least one client device 110 that can connect to servers, such as data management platform 120 (e.g., server(s)), via a network 130. One client device 110 and one data management platform 120 are illustrated as connected to network 130 for simplicity. In practice, there may be more clients and/or servers. Also, in some instances, a client may perform one or more functions of a server and a server may perform one or more functions of a client. Client device 110 may access or receive information from data management platform 120. The system architecture 100 can represent a cloud-based environment, which can enable communication between server(s) hosting document platform 120 and client devices 110 over the network 130 to store and share electronic documents. Alternatively, the system architecture 100 can apply to systems that are locally interconnected. Further, although some aspects of the disclosure are described with reference to spreadsheets and document applications managing spreadsheets, it should be understood to those skilled in the art that the systems, methods, functions, and embodiments of the present disclosure can apply to any type of electronic documents and any type of programs or services offered by any type of host applications.

In implementations, network 130 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. Client device 110 can include a computing device such as personal computer (PC), laptop, mobile phone, smart phone, tablet computer, netbook computer, network-connected television, etc. The client device 110 can be associated with one or more users, and the client device 110 can also be referred to as a "user device."

In the implementation shown, data management platform 120 may interact with client device 110 such that client device 110, in conjunction with data management platform 120, execute one or more data management applications to manage various documents. For example, the data management applications can be online data management applications, web applications, cloud-based applications, client-based data management applications, etc. In some implementations, data management applications are cloud-based or web-based productivity suite applications that can interact with a web browser 115 (rather than a designated document application) to, for example, present documents, receive user input related to the documents, etc. Alternatively, the data management applications can be client-based applications (hosted by client device 110) that provide functionality described herein with or without the use of document platform 120. The data management applications can include, for example, email applications, document processing applications, calendar applications, spreadsheet applications, project management applications, online word processing application, online task management application, and which can serve as a host application 150a or a source application 150b. It should be understood that a host application 150a can contain embedded data objects from source application 150b. Alternatively, a data management application can be executed locally on the client device 110.

Data management structures created by the client device 110 may be stored by data management platform 120 in, for example, data store 140, host application data store 142, and source application data store 143 and can include application data objects, embedded data containers, and application graphical user interfaces associated with one or more host applications 150a or source applications 150b. In some cases, host application 150a can have exclusive access to the host application data store 142, the source application 150b can have exclusive access to source application data store 143, and both applications can have access to data store 140 which can serve as a common data store. Although illustrated as a single device in FIG. 1, data management platform 120 may be implemented as, for example, a single computing device or as multiple distributed computing devices. It should be understood and appreciated that whether a device is functioning as a server or a client device can depend on the specific application being implemented. That is, whether a computing device is operating as a client or a server may depend on the context of the role of the computing device within the application. The relationship of client device and server can arise by virtue of program executing on the respective devices and having a client-server relationship to each other.

As discussed above, the interaction of client device 110 with data management platform 120 may be implemented through a web browser 115 executed at client device 110. For example, a data management application such as one of a host application 150a or a source application 150b may be a web application that runs within the browser program 115. The term browser program is intended to refer to any program that allows a user to browse markup documents (e.g., web documents), regardless of whether the browser program is a stand-alone program or an embedded program, such as a browser program included as part of an operating system. In some implementations, the data management applications, as described herein are implemented as distributed web applications in which portions of each of the data management application execute at one or more of client device 110 and at data management platform 120. More specifically, the client devices 110 may request the data management application from data management platform 120. In response, data management platform 120 may transmit portions of the data management application for local execution at clients 110. The data management applications may thus execute as respective distributed applications across data management platform 120 and one or more of the client devices 110. In this manner, client device 110 may not be required to install any data management application locally to use the data management application hosted by the data management platform 120.

In general, functions described in implementations as being performed by the data management platform 120, by host application 150a, or source application 150b, can also be performed on the client device 110 in other implementations, if appropriate. In addition, the functionality attributed to a particular component can be performed by different or multiple components operating together. The data management platform 120 can also be accessed as a service provided to other systems or devices through appropriate application programming interfaces.

In some implementations, data management platform 120 can include an integration application manager 160 that manages communication and acts as intermediary between host application 150a and source application 150b. In other embodiments, integration application manager 160 can reside partially or entirely on client device 110. In yet some other implementations, host application 150a and source application 150b can reside on the client device 110 and can communicate with each other (e.g., via inter-process communication, using a shared data store, etc.) without the use of integration application manager 160.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline, such as a topic channel, of the content sharing platform 120.

A document, as described herein, may be implemented as a distributed web application in which portions of the application execute at multiple client devices 110 and at the document platform 120 to provide for collaboration among multiple users working on a single document. For example, multiple users may simultaneously or concurrently edit such a collaborative document and view the edits of each of the users in real time or near real time (e.g., within a few milliseconds or seconds). When one user edits the document, the edit may be transmitted to the document platform 120 and then forwarded to other collaborating users that are also editing or viewing the spreadsheet. To this end, the document platform 120 may handle conflicts between collaborating users, such as when two users try to simultaneously edit a portion of the document. For example, the document platform 120 may accept the first edit received or in some way prioritize the collaborating users such that the edits of higher priority users override those of lower priority users. If an edit of a user is rejected by the document platform 120, the document platform 120 may transmit a message back to the user that informs that user of the rejection of the edit. In this manner, multiple users may collaborate, potentially in real-time (or near real-time), on a single document. In some implementations, the parties that view and collaborate on a particular document may be specified by an initial creator of the document. For example, the initial creator of the document may be given "administrator" privileges that allow the creator to specify the privileges for each of the other possible collaborators. The initial creator may specify that the other collaborators have privileges to do one or more of the following: edit the document, view the document only, edit designated parts of the document, or add additional users to the list of possible collaborators. For example, certain users may be able to edit certain parts of the document, while other designated portions of the document can be "locked" to those users such that the users can view but not edit the locked portions. In some implementations, a document may be designated as a "public" document that anyone can view and/or edit.

Figure 2:
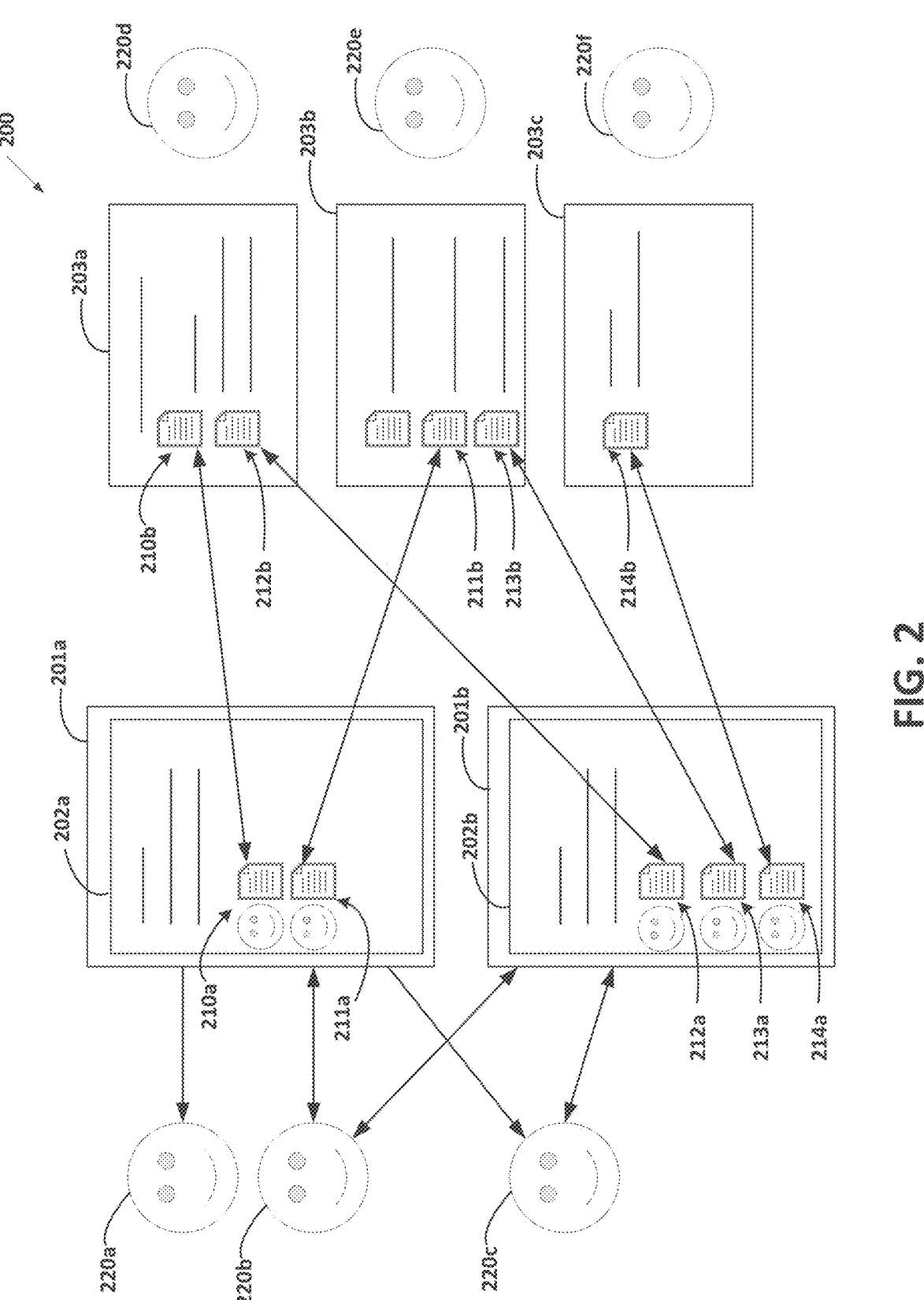
FIG. 2 is a diagram illustrating the sharing of data between instances of different applications, in accordance with implementations of the present disclosure.

As further explained with reference to FIG. 2, which depicts the sharing of data between instances of different applications in a data management platform 200, in accordance with implementations of the present disclosure, the functions and operations described can be performed using system 100 described above. Data management platform 200 may include one or more applications such as host application 150a (e.g., a word processing application) and source application 150b (e.g., a task management application).

In some implementations, host application 150a can provide one or more host application graphical user interfaces 201a and 201b through which a user can access one or more host application files 202a and 202b respectively. Host application files 202a and 202b can be understood to be data containers as they may contain a variety of data types and formats and can include embedded data objects. For example, as depicted in FIG. 2, host application file 202a can have data objects that are associated with a source application and are embedded by anchoring or logical association with a visual element in a host application graphical user interface 201a and serve as embedded source application data objects 210a and 211a. Analogously, host application file 202b can have three embedded data objects such as embedded source application data objects 212a, 213a, and 214a. Each of the embedded data objects 210a-214a (also referred to herein as an "embedded data object") can correspond to a source application data object 210b-214b (also referred to herein as a "source copy of the data object"). Each data object of a pair of corresponding data objects (e.g. 212a and 212b) can be updated based on changes made to the other object in the pair.

In the depicted implementation, source application data objects 210b-214b can be visually illustrated, accessed, and modified through respective source application graphical user interfaces 203a-203c allowing a user to interact with, for example, source application 150b. For example, source application graphical user interface 203b can include visual representations of source application data object 211b and source application data object 213b along with respective data and information associated with each object.

In some implementations, data access policies or access permissions can control who is permitted to view or make changes to data contained in the applications via the respective user interfaces. For example, as represented by the unidirectional arrow, user 220a can have viewing permission to host application file 202a through host application interface 201a but not edit permission (e.g., permission to make any changes) for the data contained in the file of the host application. On the other hand, user 220b, can, as indicated by the bidirectional arrow, have both viewing permission and editing permission with respect to the host application file 202a and host application file 202b. Analogously, user 220c has viewing permission for host application file 202a and both viewing and editing permission for host application file 202b. In some implementations, if a user has the requisite permissions to edit the data of a host application file, the user can also thereby edit the data objects embedded in that file including, for example, embedded source application data objects 210a-214a.

Source application graphical user interfaces 203a-203c can be exclusively accessible to a particular user. For example, in the depicted implementation, source application graphical user interface 203a along with the included source application data objects 210b and 212b can be exclusively accessible to user 220d. Similarly, source application graphical user interface 203b along with the presented source application data objects 211b and 213b can be exclusively accessible to user 220e and source application graphical user interface 203c along with the presented source application data object 214b can be exclusively accessible to user 220f. Instances or respective copies of the data objects can be updated by changes made via either one of the graphical user interfaces (GUIs) of either the host application or the source application. Maintenance of current up-to-date copies of data objects in each respective application through updates and notification of changes to the data of the data objects, as can be understood in more detail with reference to FIG. 3 described below.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 3:
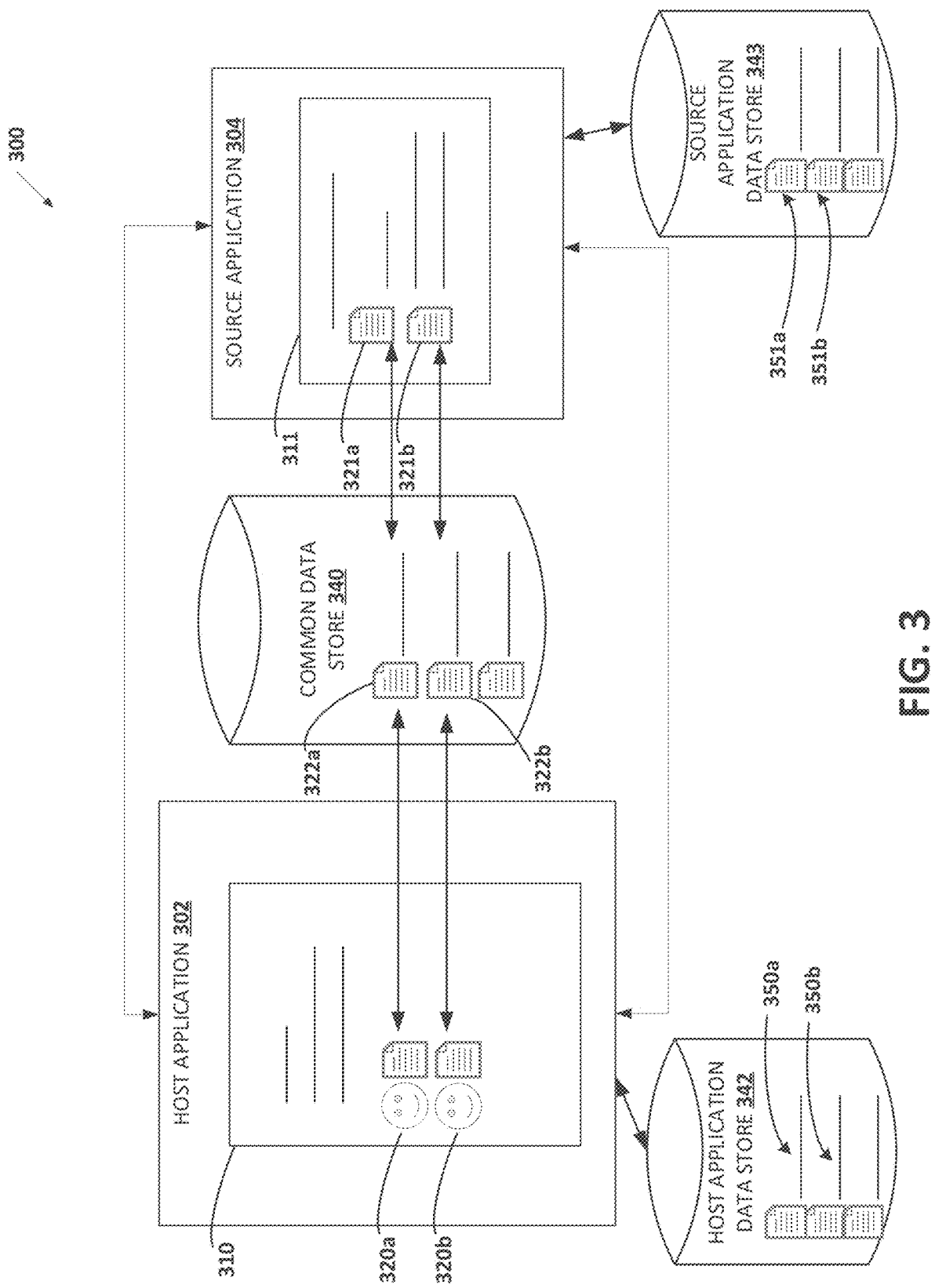
FIG. 3 is a block diagram illustrating synchronization and storage of data between instances of different applications, in accordance with implementations of the disclosure.
Figure 4:
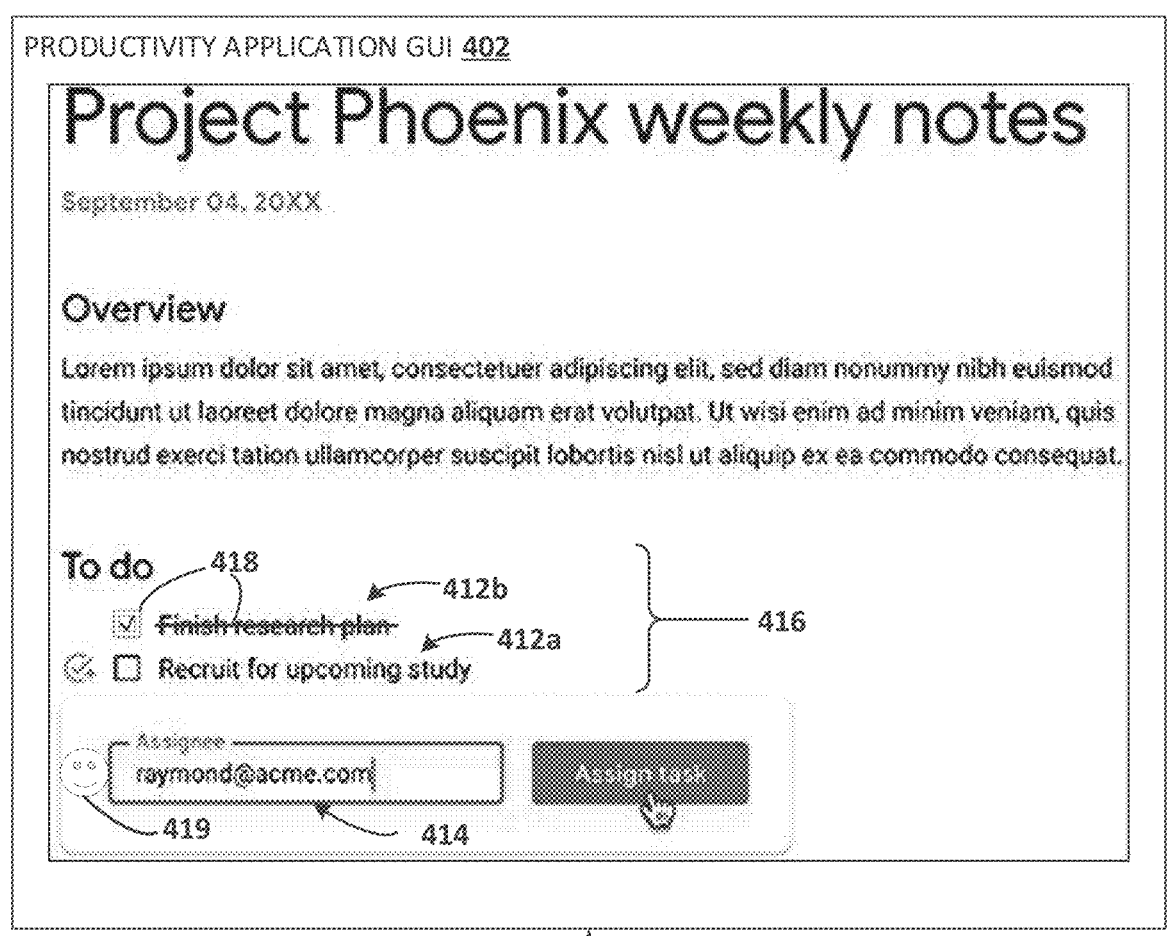
FIG. 4 depicts a block diagram of interconnected applications, in accordance with implementations of the present disclosure.
Figure 4:
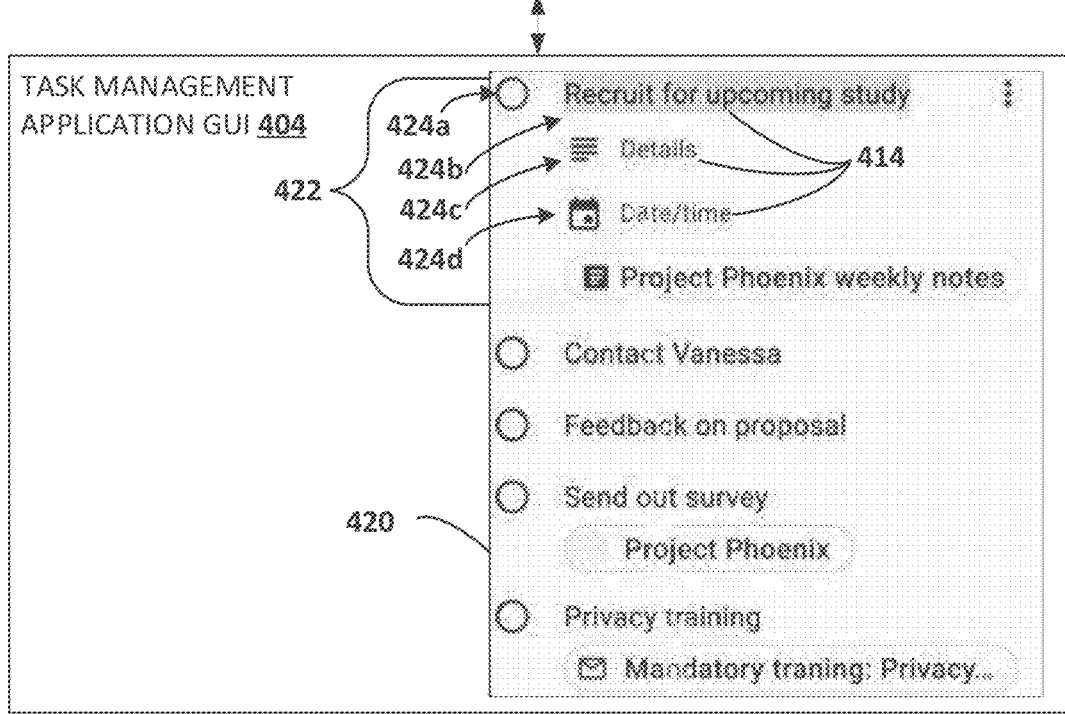

FIG. 3 is a block diagram illustrating synchronization and storage of data in a system 300 between instances of different applications such as host application 302 and source application 304, according to some embodiments. While a data object can be generated in either a host application 302 via host application GUI 310 or in source application 304 via source application GUI 311, unlike a source application GUI 311, the host application GUI 310 can contain embedded data objects 320a, 320b. An embedded data object can be associated with a corresponding source application data object. It should be understood that the terms "embedded data object" and "embedded source application data object" can be used interchangeably herein. Further, it should be understood that "source data object", "source application data object", and "source copy of the data object" can be used interchangeably herein. For example, embedded source application data object 320a can be associated with a corresponding source copy of the data object 321a, while embedded data object 320b can be associated with a source data object 321b. Each one of the corresponding data objects can be representative of the same conceptual element (e.g., a task) but may have data or metadata associated with it depending on the application within which it is contained.

In some implementations, each application can have its own exclusive data store for recording the data of the respective application. For example, host application 302 can have access to host application data store 342 where it can record data as needed for its operation. For example, host application 302 can record data representative of a file of host application 310 and the embedded data objects 320a and 320b contained within it as records 350a and 350b respectively in the host application data store 342. Similarly, source application 304 can be have access to a source application data store 343 where it can record data as needed for its operation. For example, source application 304 can record data representative of a source application GUI 311 and the source data objects 321a and 321b contained within it as records 351a and 351b respectively in the source application data store 343. The records contained in the data stores can include data defining the data objects and the history of the changes made to them. For example, record 350b can include data pertaining to embedded data object 320b and all of the changes that have ever been made to it.

In some implementations, host application data store 342 can be exclusively accessible by host application 302 while source application data store 343 can be exclusively accessible by source application 303. Having separate data stores for each application can allow each application to operate according to its respective compliance policies with respect to its data. Further, in order to maintain a common source of up-to-date information for corresponding data objects between the pair of applications, both of the applications can have access to a shared or common data storage location.

Accordingly, in some implementations, both the host application 302 and the source application 304 can have access to a common data store 340. Each application can access the common data store 340 directly or through the other application. The common data store 340 can store records 322a, 322b corresponding to data objects of the host application 302 and the source application 304. For example, embedded data object 320a from host application 302 that is associated with source application data object 321 can have a corresponding record 322a saved in the common data store 340. The record 322a can include the data of the most current version of the corresponding data object as well as a record of all the changes that have ever been made to it. In some implementations, whenever a data object is generated or embedded in a host application file (e.g., via GUI 310), a corresponding record can be created in a common data store. Thereafter, whenever a change is made to the data object, either by a change being made to the embedded data object in the host application 302 or by a change being made to the source data object in the source application 304, the change can be recorded in the common data store. Accordingly, as noted earlier, while the host application 302 and the source application 304 can have different access permissions and rules for different users, regardless of which application a change may have originated from, if a change was made in either application to a data object, that change can be propagated to the corresponding record in the common data store 340.

In some implementations, the common data store may include an embedded data index table that can be managed by the host application 302. For example, if after a source data object 321b is generated and embedded into the host application 302 as embedded source application data object 320b, the source data object 321b is modified through the source application GUI 311, a notification can be sent to the host application 302 from the source application to update the corresponding embedded data object 320b in accordance with the change being made. The update can then be performed in the host application 302 if the access permission allow it or a notification can be then generated regarding the update if the access permission do not allow the user who made the change to the source data object to make changes in the host application 302. However, regardless of whether the user who made the change to the source application data object had the requisite permissions, the change can get recorded in the embedded data index table in the common data store 340 by the host application (or, alternatively, by the source application) to ensure that no changes that are made to the data object are lost.

This common data store 340, or, in some implementation the embedded data index table contained within it, can be used to perform periodic data inconsistency checks. For example, at periodic time intervals, data pertaining to a data object can be compared between the host application data store 342 and the common data store 340. Similarly, at periodic time intervals, data pertaining to a data object can be compared between the source application data store 343 and the common data store 340. If the data pertaining to the data object contained in one data store is inconsistent with the data pertaining to the data object contained in the other data store, a notification of the inconsistency can be generated and presented to a user of one of the applications. Alternatively, if an inconsistency is detected, the data pertaining to the data object common data store 340 can be used to replace the data pertaining to the data object in the other data store and to update the respective application GUI data object accordingly. Implementations of methods for creating and assigning task and their associated data objects are described below in more detail with reference to FIGS. 5A-5B.

FIGS. 4A and 4B illustrate example graphical user interfaces (GUIs) provided by a productivity application and a task management application respectively, in accordance with some implementations. In some implementations, the productivity application GUI 402 can be a GUI provided by a cloud-based or client-based word processing application configured with data objects embedded from the task management application.

The productivity application can serve as the host application 150a and can have an associated graphical user interface (GUI) 402 allowing users to interact and work with the files of the productivity application (e.g., host application data containers). The productivity application GUI 402 can be configured to present lists such as checklists of items which can be defined as embedded data objects 416 associated with one or more tasks 412a, 412b. In the depicted example, the "To do" list includes two tasks, namely, the task 412b of "Finish research plan", each of which can be defined as an embedded task data object (e.g., an assignor task object) 416 associated with a source task data object (e.g., an assignee task object) 422 described in more detail below.

In some implementations, visual representations of embedded task data objects 416 can have information related to their respective associated tasks visible to users of the productivity application GUI 402. For example, the name or title of the task 412 can be seen along with the completion status indicator 418 indicating that the titled "Finish research plan" has been completed. A user can assign a task to another user through the interface 410. For example, in the depicted implementation, an assignor user can assign task 412a by modifying the embedded task data object and selecting an assignee user by indicating the assignee user's email in field 414 or by selecting the assignee user's avatar 419. In some implementations, assigning the task to a user can include generating a graphical representation of the assignee user (a "graphical assignee user representation") such as an avatar positioned next to the task or the embedded task object 416 to indicate that the task has been assigned to the assignee user. In the depicted implementation, the productivity application 402 sends a notification to the task management application 404 indicating that task 412a entitled "Recruit for upcoming study" has been assigned to the assignee user by the assignor user.

The task management application can present GUI 404 including a graphical representation 420 of a data container associated with the task with one or more interactive graphical elements 424a-424d that contain information associated with the task. The graphical representation 420 can be based on one or more data objects associated with respective tasks. For example, the graphical elements 424a-424d can be based on task properties 422 associated with embedded task data object 416 and can include information 414 related to the task. In some implementations, graphical element 424a can represent a completion indicator and can include information regarding the completion status of the task and can be toggled to indicate whether the task has been completed or not. Graphical element 424b can be a text field and can include information 414 regarding the title of the task and can be modified by an assignee user to change the name of the task in the task management application GUI 404. Graphical element 424c can represent information 414 comprising notes and comments related to the task and can be modified by an assignee user to add or remove textual content related to the task that is visible only to the assignee user. Graphical element 424d can represent a date field and can include information 414 relating to the due date of the task and can be modified by the assignee user to change the personal due date that may not be synchronized with the due date assigned by the assignor user.

In some implementations, when an assignee makes a modification to the information related to a task (e.g., by toggling completion indicator 424a) to indicate a change in the completion status of the task, the task management application can send a notification to the productivity application to make a corresponding update. The productivity application can update the embedded task data object with a modification that corresponds to the modification the assignee made in the task management application GUI 404. The productivity application GUI 402 can have a check in a check box or a strikeout of a task title to serve as an indicator 418 of a changed (e.g., finished) completion status of a corresponding embedded task data object and can be visible to the assignor as a user of the file of the productivity application in which the data object is embedded. Notably, the changes made in the task management application to information that does not relate to the completion status of a task will not be synchronized with the productivity application. A more detailed description of methods for assigning and modifying tasks between users of different applications is provided below with reference to FIGS. 5A and 5B. Corresponding methods 500a and 500b may be performed by processing logic that may include hardware (circuitry, dedicated logic, etc.), software (e.g., instructions run on a processing device), or a combination thereof. In some implementations, some or all of the operations of methods 500a and 500*b* may be performed by host application 150*a*, source application 150*b* or integration application manager 160 of FIG. 1.

Figures 5A, 5B:
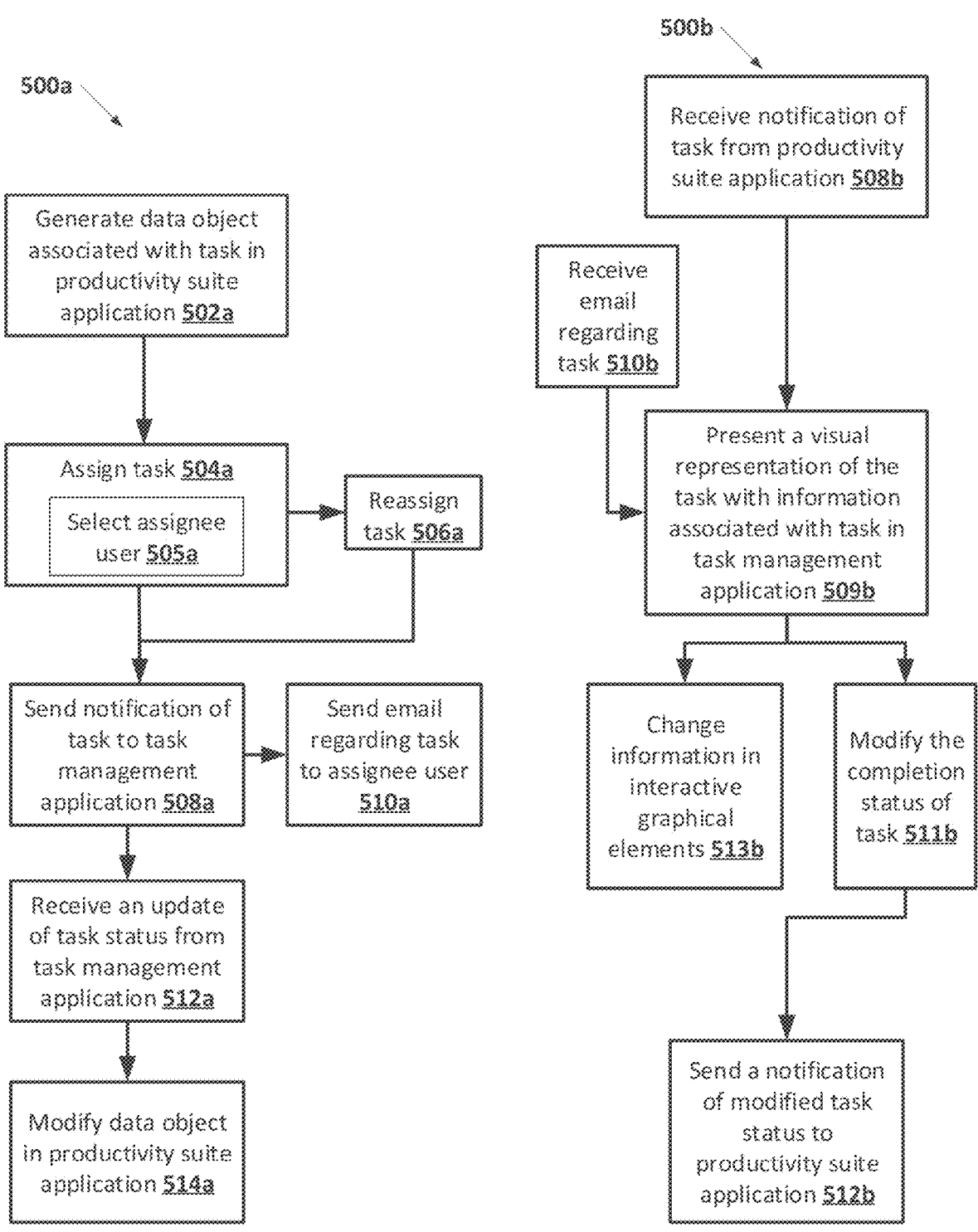
FIGS. 5A and 5B depict flow diagrams of methods for assigning and editing tasks between different applications, in accordance with implementations of the present disclosure.

FIGS. 5A and 5B depict flow diagrams of methods 500*a* and 500*b* respectively for assigning and editing tasks between different applications from the perspectives of users of a host application and a source application. Method 500*a* relates to tasks being assigned and tracked from the perspective of a source application (e.g., productivity application 402) while method 500*b* relates to tasks being assigned and modified from the perspective of a source application (e.g., task management application 404).

At block 502*a*, the processing logic can generate a data object that is associated with a task represented in the user interface of the productivity application. In some implementations, the data object can be the embedded task data object in the host application. At block 502, to create the task and generate the data object of the task, the processing logic can receive a user input from the assignor user (e.g., via the interface of the productivity application 402) indicating a request to create a task and present a visual representation of the task to the assignor user (e.g., via the interface of the productivity application 402). The processing logic can, at block 504*a*, receive user input indicating an assignment of the task to an assignee and accordingly assign the task to an assignee. Assigning the task to an assignee can include selecting, based on input of an assignor user, an assignee user from a list of users, at block 505*a*, or identifying the assignee user in accordance with the manners described with reference to FIG. 4 above. In some instances, the processing logic can reassign the task to another assignee user at block 506*a* in a manner similar to how the task was initially assigned. For example, at block 506*a*, the processing logic can receive an input entered by the assignor user indicating another assignee user for the task and adding the other assignee user instead of or in addition to the assignee user to whom the task was previously assigned.

The processing logic can send a notification to the source application indicating the task and its assignment to the assignee, at block 508*a*, and present (e.g., via the user interface of the source application) a visual representation of the task for the assignee to see. The visual representation of the task, can, for example in the interface of the source application, have one or more interactive graphical elements 424*a*-424*d*. The processing logic can also send an email to the assignee at block 510*a* notifying the assignee of the assigned task. At this point, the assignee can view the assigned task within the source application. For example, once the task is assigned by the assignor in a productivity application, the assignee can view and edit the task's properties in the task management application GUI. At block 512*a*, the processing logic can receive a notification from the source application with an update indicating a change in the completion status of the task. For example, at block 512*a*, the processing logic can receive from the assignor user a user input pertaining to one of the interactive graphical elements relating to a completion status of the tasks indicating a change in the completion status of the task. In this manner, a productivity application can receive an update from the task management application indicating that the task has been completed. Consequently, the processing logic can send, at block 514*a*, a notification indicating the modified completion status of the task to the host application. In this manner, the host application can modify the data object associated with the task in the user interface of the host application and update the visual representation of the task with a visual indication (e.g. a change made to the appear-ance of the visual representation) of the change in the status of the task. For example, a check box can be checked or the title of the task can be crossed out in the embedded data object of the host productivity application. A mirrored method 500*b* performed on the side of the source application can be understood to operate in conjunction with the elements of method 500*a* described above.

In some implementations, the processing logic can receive a notification indicating an assignment of a task to an assignee in block 508*b*. This notification can correspond to the notification sent in block 508*a* from the host application to the source application. In other implementations, the processing logic can receive an email containing a notification of the assigned task in block 510*b*. This email can correspond to the email sent in block 510*a*.

In block 509*b*, the processing logic can present a graphical representation 420 of a data container associated with the task and a visual representation of the task 422 in the graphical user interface (GUI) of a source application. The graphical representation can include one or more interactive graphical elements 424*a*-424*d* (e.g., a text field or comple-tion status indicator) containing information associated with the task. One of the interactive graphical elements can correspond to and indicate changes to the completion status of the task based on input from a user. In some implemen-tations, they can contain an indication of the completion status of the task, the task title, the due date, and notes and comments related to the task. The information of the inter-active graphical elements can be changed at block 513. The processing logic can modify, at block 511, the completion status of the task based on user input pertaining to the graphical element related to the indication of task status. An assignee user can provide that input by modifying the information of one of the graphical elements such as, for example, the completion status indicator 424*a*. At block 512, the processing logic can send a notification indicating the modified completions status of the task from the source application to the host application. This indication of the change in completion status can correspond to the update of the task status received in block 512. Notably, some of the changes made in block 513 are not visible or accessible to the assignor of the task as they may be exclusively contained within the user interface of the source application. The processing logic can receive a user input indicating a change to a property of the task (e.g., task title, task due date, task comments/notes etc.) and modify an interactive graphical element corresponding to the property based on the user input. In some implementations, the processing logic, based on a setting of an interactive graphical element correspond-ing to a property, can refrain from notifying the host application about the change to the property of the task occurring via the source application. Accordingly, because the source application is inaccessible to an assignor user of the host application due to access permission rules, in some implementations changes related to the task (e.g., to the assignee task object) in the source application by the assignee can be hidden from the assignor unless the changes pertain to the completion status of the task.

Figure 6:
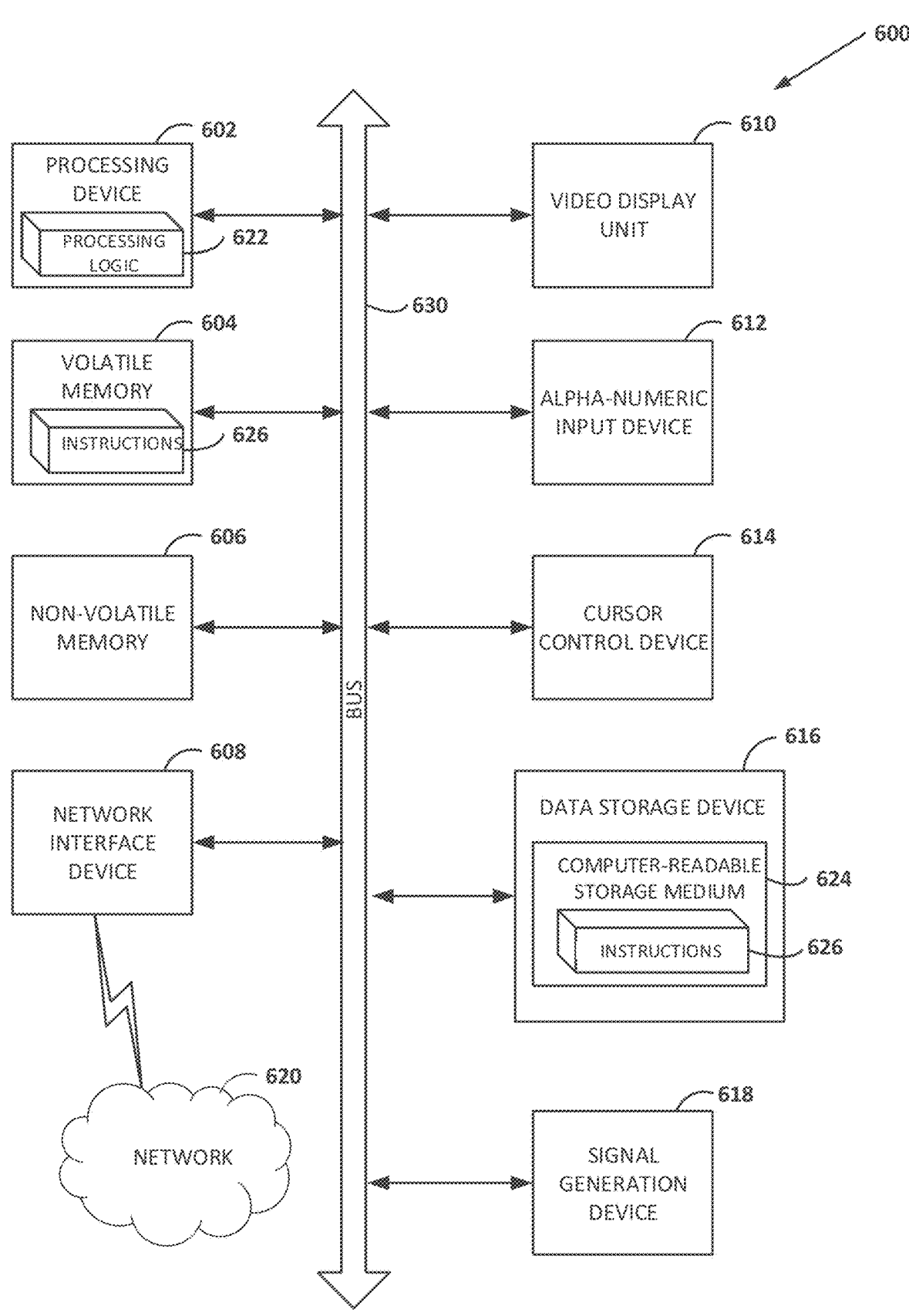
FIG. 6 is a block diagram illustrating an exemplary computer system, in accordance with implementations of the present disclosure.

FIG. 6 is a block diagram illustrating an exemplary computer system, in accordance with implementations of the present disclosure. The computer system 600 can be the server machine 130 or client device 110 in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (processor) 602, a main memory (memory device) 604 (e.g., read-only memory (ROM), flash memory, dynamic random access memory (DRAM) such as synchronous DRAM (SDRAM), double data rate (DDR SDRAM), or DRAM (RDRAM), etc.), a static memory 606 (e.g., flash memory, static random access memory (SRAM), etc.), and a data storage device 618, which communicate with each other via a bus 640.

Processor (processing device) 602 represents one or more general-purpose processing devices such as a microprocessor, central processing unit, or the like. More particularly, the processor 602 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 602 can also be one or more special-purpose processing devices such as an application specific integrated circuit (ASIC), a field programmable gate array (FPGA), a digital signal processor (DSP), network processor, or the like. The processor 602 is configured to execute instructions 605 (e.g., for generating, embedding, and updating data objects and for assigning and modifying tasks in different applications) for performing the operations discussed herein.

The computer system 600 can further include a network interface device 608. The computer system 600 also can include a video display unit 610 (e.g., a liquid crystal display (LCD) or a cathode ray tube (CRT)), an input device 612 (e.g., a keyboard, and alphanumeric keyboard, a motion sensing input device, touch screen), a cursor control device 614 (e.g., a mouse), and a signal generation device 620 (e.g., a speaker).

The data storage device 618 can include a non-transitory machine-readable storage medium 624 (also computer-readable storage medium) on which is stored one or more sets of instructions 605 (e.g., for generating, embedding, and updating data objects and for assigning and modifying tasks in different applications) embodying any one or more of the methodologies or functions described herein. The instructions can also reside, completely or at least partially, within the main memory 604 and/or within the processor 602 during execution thereof by the computer system 600, the main memory 604 and the processor 602 also constituting machine-readable storage media. The instructions can further be transmitted or received over a network 630 via the network interface device 608.

In one implementation, the instructions 605 include instructions for generating, embedding, maintaining, and updating data objects across different applications. While the computer-readable storage medium 624 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/ or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collect data is anonymized prior to performing any analysis to obtain any statistical patterns so that the identity of the user cannot be determined from the collected data.

What is claimed is:

1. A system comprising:
a memory device; and
a processing device, coupled to the memory device, the processing device configured to:
provide a user interface (UI) of a first application, the user interface of the first application comprising a list of tasks, a visual status indicator of a status of each task in the list, and an assignment UI element to request that a corresponding task on the list be completed;
receive, via the user interface of the first application, user input indicating a request of a user to create a new task;
cause the new task to be added to the list of tasks in the user interface of the first application with a first visual status indicator indicating that a status of the new task is incomplete;
receive, via the user interface of the first application, a user selection of the assignment UI element to request that the new task be completed on behalf of the user;
cause a first notification indicating the new task and the request to complete the new task on behalf of the user to be sent to a second application;
receive a second notification associated with the second application, the second notification being indicative of a change to the status of the new task; and
in response to receiving the second notification associated with the second application, cause the first visual status indicator of the new task to be modified in the user interface of the first application to graphically illustrate the change in the status of the new task.

2. The system of claim 1, wherein the user is an assignor user and the task to be completed is assigned to an assignee user, and wherein the processing device is further configured to send an email to the assignee user notifying the assignee user of the assigned task.

3. The system of claim 2, wherein to cause the new task to be added to the list of tasks in the user interface of the first application, the processing device is further configured to:

generate, based on the user input indicating the request to create the task, a data object defining a plurality of properties of the task; and
generate a visual representation of the task based on the plurality of properties defined in the data object.

4. The system of claim 3, wherein the processing device is further configured to add the assignee user indicated by the user input to the data object.

5. The system of claim 3, wherein the processing device is further configured to:
receive user input indicating a second assignee user of the task; and
add the second assignee user to the data object for the task.

6. The system of claim 1, wherein the first application is a productivity suite application.

7. The system of claim 1, wherein the second application is a task management application.

8. A method comprising:
providing a user interface (UI) of a first application, the user interface of the first application comprising a list of tasks, a visual status indicator of a status of each task in the list, and an assignment UI element to request that a corresponding task on the list be completed;
receiving, via the user interface of the first application, user input indicating a request of a user to create a new task;
causing the new task to be added to the list of tasks in the user interface of the first application with a first visual status indicator indicating that a status of the new task is incomplete;
receiving, via the user interface of the first application, a user selection of the assignment UI element to request that the new task be completed on behalf of the user;
causing a first notification indicating the new task and the request to complete the new task on behalf of the user to be sent to a second application;
receiving a second notification associated with the second application, the second notification being indicative of a change to the status of the new task; and
in response to receiving the second notification associated with the second application, causing the first visual status indicator of the new task to be modified in the user interface of the first application to graphically illustrate the change in the status of the new task.

9. The method of claim 8, wherein the user is an assignor user and the task to be completed is assigned to an assignee user, and wherein the method further comprises sending an email to the assignee user notifying the assignee user of the assigned task.

10. The method of claim 9, wherein causing the new task to be added to the list of tasks in the user interface of the first application further comprises:
generating, based on the user input indicating the request to create the task, a data object defining a plurality of properties of the task; and
generating a visual representation of the task based on the plurality of properties defined in the data object.

11. The method of claim 10, further comprising adding the assignee user indicated by the user input to the data object.

12. The method of claim 10, further comprising:
receiving user input indicating a second assignee user of the task; and
adding the second assignee user to the data object for the task.

13. The method of claim 8, wherein the first application is a productivity suite application.

14. The method of claim 8, wherein the second application is a task management application.

15. A non-transitory computer readable medium comprising instructions, which when executed by a processing device, cause the processing device to perform operations comprising:

providing a user interface (UI) of a first application, the user interface of the first application comprising a list of tasks, a visual status indicator of a status of each task in the list, and an assignment UI element to request that a corresponding task on the list be completed;

receiving, via the user interface of the first application, user input indicating a request of a user to create a new task;

causing the new task to be added to the list of tasks in the user interface of the first application with a first visual status indicator indicating that a status of the new task is incomplete;

receiving, via the user interface of the first application, a user selection of the assignment UI element to request that the new task be completed on behalf of the user;

causing a first notification indicating the new task and the request to complete the new task on behalf of the user to be sent to a second application;

receiving a second notification associated with the second application, the second notification being indicative of a change to the status of the new task; and in response to receiving the second notification associated with the second application, causing the first visual status indicator of the new task to be modified in the user interface of the first application to graphically illustrate the change in the status of the new task.

16. The non-transitory computer readable medium of claim 15, wherein the user is an assignor user and the task to be completed is assigned to an assignee user, and wherein the operations further comprise sending an email to the assignee user notifying the assignee user of the assigned task.

17. The non-transitory computer readable medium of claim 16, wherein causing the new task to be added to the list of tasks in the user interface of the first application further comprises:

generating, based on the user input indicating the request to create the task, a data object defining a plurality of properties of the task; and generating a visual representation of the task based on the plurality of properties defined in the data object.

18. The non-transitory computer readable medium of claim 17, the operations further comprising adding the assignee user indicated by the user input to the data object.

19. The non-transitory computer readable medium of claim 17, the operations further comprising:

receiving user input indicating a second assignee user of the task; and adding the second assignee user to the data object for the task.

20. The non-transitory computer readable medium of claim 15, wherein the first application is a productivity suite application, and the second application is a task management application.

* * * * *